(12) United States Patent
Murakami et al.

(10) Patent No.: US 11,277,047 B2
(45) Date of Patent: Mar. 15, 2022

(54) BUSBAR APPARATUS, MOTOR, AND METHOD OF MANUFACTURING BUSBAR APPARATUS

(71) Applicant: Nidec Corporation, Kyoto (JP)

(72) Inventors: Shunsuke Murakami, Kyoto (JP); Tatsuya Onishi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 164 days.

(21) Appl. No.: 16/793,027

(22) Filed: Feb. 18, 2020

(65) Prior Publication Data

US 2021/0050759 A1 Feb. 18, 2021

(30) Foreign Application Priority Data

Mar. 27, 2019 (JP) .............................. JP2019-059608

(51) Int. Cl.
*H02K 3/50* (2006.01)
*H02K 3/38* (2006.01)
*H02K 5/22* (2006.01)
*H02K 15/00* (2006.01)

(52) U.S. Cl.
CPC ................ *H02K 3/50* (2013.01); *H02K 3/38* (2013.01); *H02K 5/225* (2013.01); *H02K 15/0062* (2013.01); *H02K 2203/09* (2013.01)

(58) Field of Classification Search
CPC ........ H02K 2203/09; H02K 3/50; H02K 3/38; H02K 5/225
See application file for complete search history.

(56) References Cited

U.S. PATENT DOCUMENTS

| | | | |
|---|---|---|---|
| 9,966,819 B2 * | 5/2018 | Schroth ............... | H02K 11/046 |
| 10,686,344 B2 * | 6/2020 | Csoti ...................... | H02K 3/522 |
| 10,903,711 B2 * | 1/2021 | Ogawa ................. | H02K 5/1732 |
| 11,056,946 B2 * | 7/2021 | Takahashi .............. | H02K 3/522 |
| 11,075,558 B2 * | 7/2021 | Yamashita .............. | H02K 3/28 |
| 2012/0037436 A1 * | 2/2012 | Kwon ..................... | H02K 3/50 180/65.1 |
| 2017/0366060 A1 | 12/2017 | Haberkorn et al. | |
| 2018/0309340 A1 * | 10/2018 | Ogawa ............... | H02K 11/0094 |
| 2019/0348884 A1 * | 11/2019 | Popa ....................... | H02K 3/18 |
| 2021/0050759 A1 * | 2/2021 | Murakami ......... | H02K 15/0068 |

* cited by examiner

*Primary Examiner* — Robert W Horn
(74) *Attorney, Agent, or Firm* — Keating & Bennett

(57) ABSTRACT

A busbar apparatus includes a busbar to be connected to an external device, and a holder to hold the busbar and made of an insulating material. The busbar includes a terminal portion to be connected to the external device, an intermediate portion continuous with the terminal portion, and a connection portion continuous with the intermediate portion. The intermediate portion includes an edge portion including portions extending along a first axis. The terminal portion extends from the edge portion. The connection portion extends from the edge portion away from the terminal portion. The terminal portion has a thickness direction extending along a second axis not parallel to the first axis. The connection portion has a thickness direction not parallel to the second axis.

12 Claims, 10 Drawing Sheets

BUSBAR APPARATUS, MOTOR, AND METHOD OF MANUFACTURING BUSBAR APPARATUS

CROSS REFERENCE TO RELATED APPLICATION

The present invention claims priority under 35 U.S.C. § 119 to Japanese Application No. 2019-059608 filed on Mar. 27, 2019, the entire contents of which are hereby incorporated herein by reference.

1. FIELD OF THE INVENTION

The present disclosure relates to a busbar apparatus, a motor, and a method of manufacturing the busbar apparatus.

2. BACKGROUND

A busbar apparatus which is arranged to connect coil wires drawn out from a stator to a connection target, such as, for example, an external device, is known.

The known busbar apparatus includes a plurality of busbars, and a busbar holder arranged to hold the busbars. The busbar holder is fitted to the stator. Each busbar includes a terminal portion connected to the connection target, such as, for example, the external device, and a connection portion connected to one of the coil wires drawn out from the stator. Such a busbar is manufactured, for example, by being stamped out of an electrically conductive, metal plate material through press working.

In the busbar apparatus as described above, the busbars tend to have a complicated shape to avoid electrical continuity therebetween, which leads to a large amount of scrap.

SUMMARY

A busbar apparatus according to an example embodiment of the present disclosure includes a busbar to be connected to an external device, and a holder to hold the busbar and made of an insulating material. The busbar includes a terminal portion to be connected to the external device, an intermediate portion continuous with the terminal portion, and a connection portion continuous with the intermediate portion. The intermediate portion includes an edge portion including portions extending along a first axis. The terminal portion extends from the edge portion. The connection portion extends from the edge portion away from the terminal portion. The terminal portion has a thickness direction extending along a second axis not parallel to the first axis. The connection portion has a thickness direction not parallel to the second axis.

A motor according to an example embodiment of the present disclosure includes a stator including a coil, a rotor supported to be capable of rotating relative to the stator, and the above-described busbar apparatus. The busbar is capable of connecting the external device and a lead wire drawn out from the coil of the stator to each other.

According to an example embodiment of the present disclosure, there is provided a method of manufacturing a busbar apparatus including a busbar to connect an external device and a lead wire drawn out from a coil of a stator to each other, and a holder to hold the busbar and made of an insulating material. The busbar includes a terminal portion to be connected to the external device, an intermediate portion continuous with the terminal portion, and a connection portion continuous with the intermediate portion. The intermediate portion includes an edge portion including portions extending along a first axis. The terminal portion extends from the edge portion. The connection portion extends from the edge portion away from the terminal portion. The terminal portion has a thickness direction extending along a second axis not parallel to the first axis. The connection portion has a thickness direction not parallel to the second axis. The method includes the steps of a) stamping a material from which the terminal portion, the intermediate portion, and the connection portion are to be made out of an electrically conductive plate material; and b) bending the material to define the busbar.

The above and other elements, features, steps, characteristics and advantages of the present disclosure will become more apparent from the following detailed description of the example embodiments with reference to the attached drawings.

DETAILED DESCRIPTION

Hereinafter, busbar apparatuses and motors according to example embodiments of the present disclosure will be described with reference to the accompanying drawings. In the following description, a direction parallel to a central axis J (see FIG. 1) is simply referred to by the term "axial direction", "axial", or "axially", radial directions centered on the central axis J are simply referred to by the term "radial direction", "radial", or "radially", and a circumferential direction centered on the central axis J, i.e., a circumferential direction about the central axis J, is simply referred to by the term "circumferential direction", "circumferential", or "circumferentially". It should be noted that the above definition of each of the above directions is made simply for the sake of convenience in description, and is not meant to restrict the posture of a busbar apparatus or a motor when in use or circulation. In addition, a radial direction, a circumferential direction, and an axial direction correspond to a direction of a first axis, a direction of a second axis, and a direction of a third axis, respectively. In the accompanying drawings, a first axial side, i.e., a first side in the axial direction, a second axial side, i.e., a second side in the axial direction, an inner side in a radial direction, an outer side in the radial direction, a first circumferential side, i.e., a first side in the circumferential direction, and a second circumferential side, i.e., a second side in the circumferential direction, are denoted as "+J", "−J", "+R", "−R", "+C", and "−C", respectively.

Figure 1:
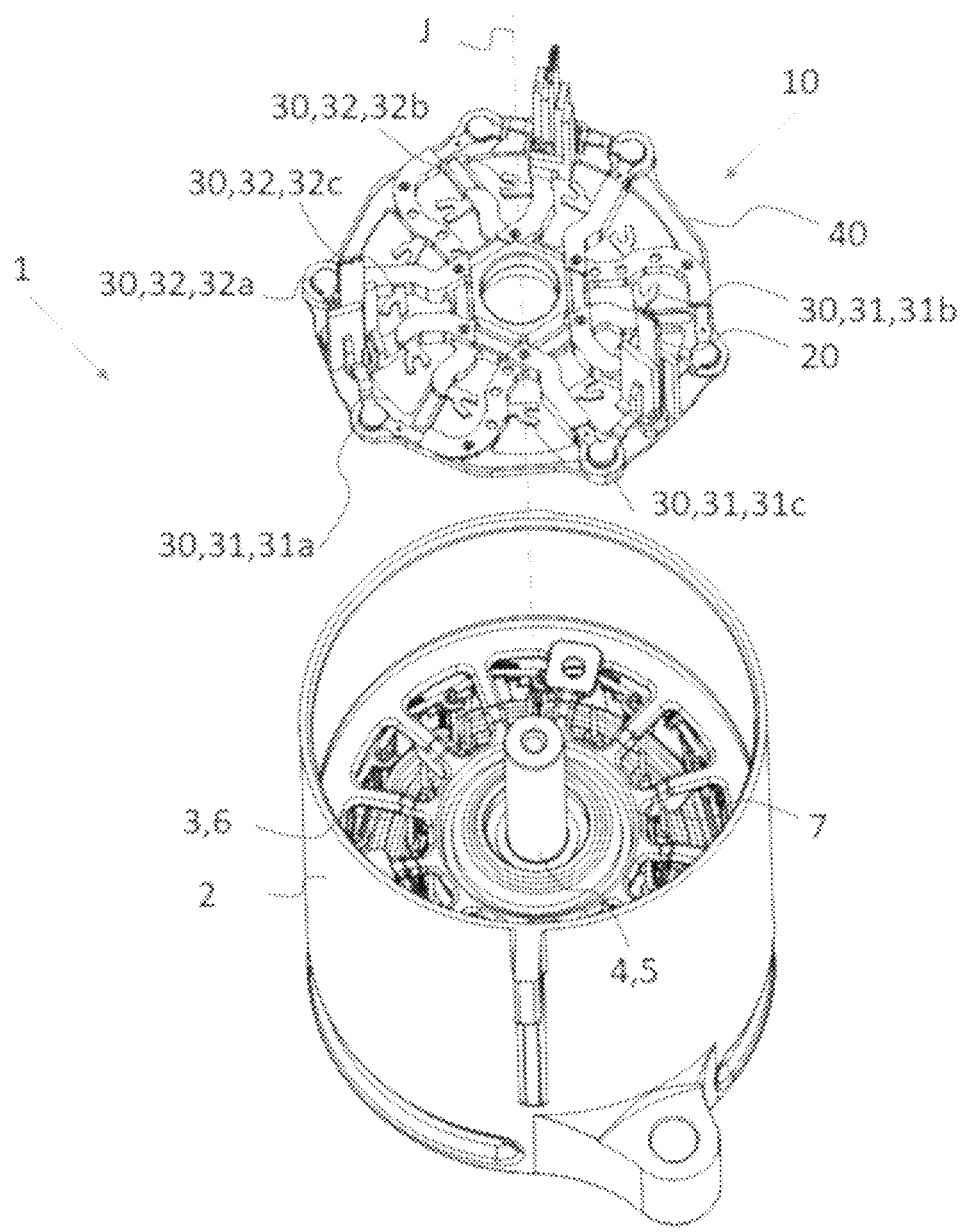
FIG. 1 is an exploded perspective view of a motor according to an example embodiment of the present disclosure.

FIG. 1 is an exploded perspective view of a motor 1 according to the present example embodiment. Referring to FIG. 1, the motor 1 includes a cylindrical housing 2, a stator 3 fixed to an inner circumferential surface of the housing 2, and a rotor 4 housed inside of the stator 3, and supported to be capable of rotating about an axis relative to the stator 3. The rotor 4 includes a shaft 5 arranged to extend along the central axis J.

Referring to FIG. 1, the housing 2 is arranged to open to the first axial side. A busbar apparatus 10 is fitted in an opening portion of the housing 2 to close the opening portion. That is, the motor 1 includes the busbar apparatus 10. In the present example embodiment, the busbar apparatus 10 is arranged on an upper side of a bearing holder. The motor 1, which includes the busbar apparatus 10, is, for example, attached to a power steering apparatus to form an electric power steering apparatus. The electric power steering apparatus is arranged to provide assistance in a steering operation using a driving force of the motor 1.

Figure 2:
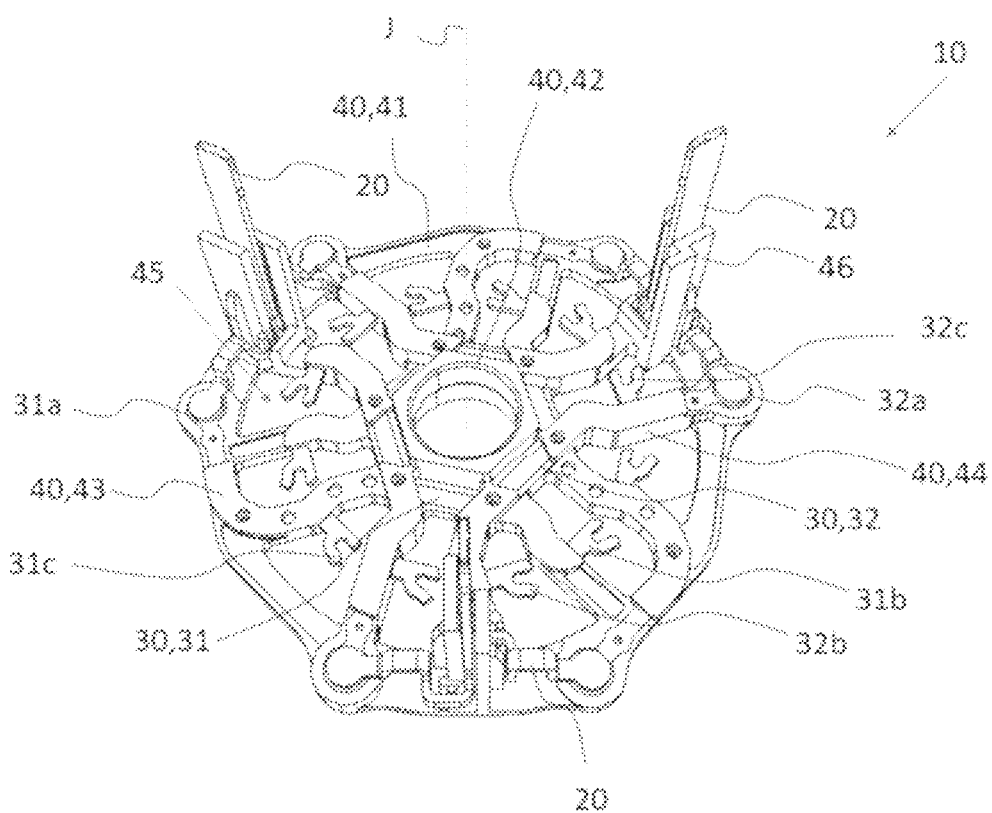
FIG. 2 is a perspective view of a busbar apparatus according to an example embodiment of the present disclosure as viewed from a first axial side.

FIG. 2 is a perspective view of the busbar apparatus according to the present example embodiment as viewed from the first axial side. Referring to FIG. 2, the busbar apparatus 10 includes busbars 20, electrically conductive members 30, and a holder 40 arranged to hold the busbars 20 and the electrically conductive members 30.

The holder 40 is made of an insulating material, such as, for example, polybutylene terephthalate (PBT). The holder 40 includes a first annular portion 41, a second annular portion 42, three first joining portions 43, and three second joining portions 44. The holder 40 corresponds to a holding member.

The first annular portion 41 is a plate portion in the shape of a circular ring and centered on the central axis J. Principal surfaces of the first annular portion 41 are arranged to extend perpendicularly to the central axis J. The first annular portion 41 is arranged to have a constant plate thickness. The principal surface of the first annular portion 41 on the first axial side corresponds to a flat portion.

Figure 3:
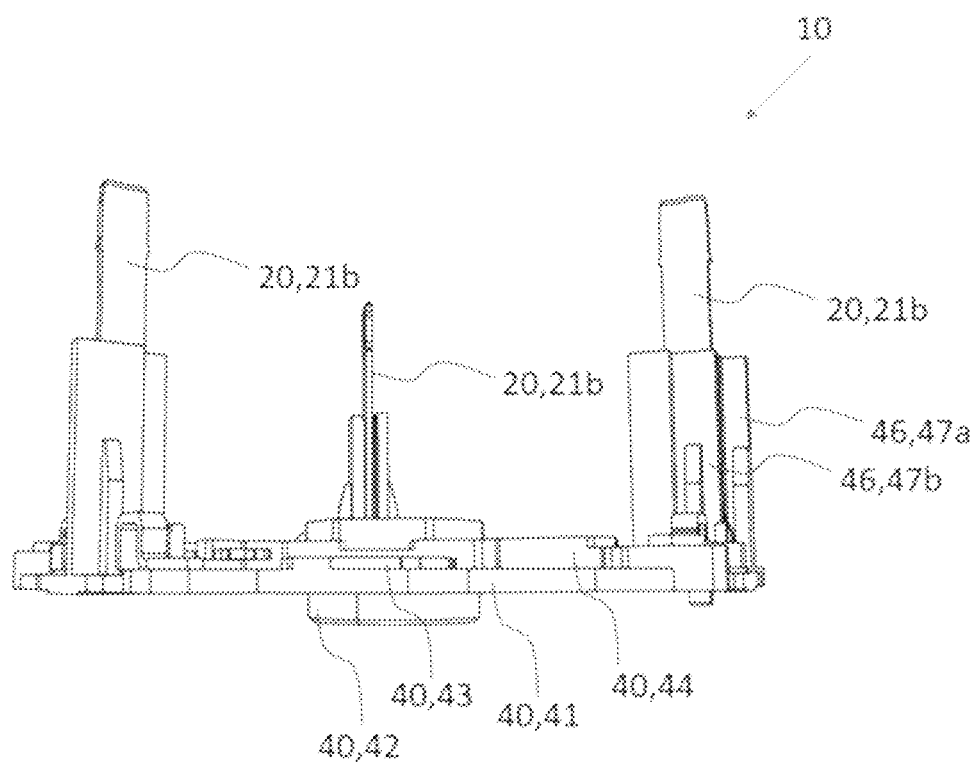
FIG. 3 is a side view of the busbar apparatus according to an example embodiment of the present disclosure as viewed from a radially outer side.

FIG. 3 is a side view of the busbar apparatus according to the present example embodiment as viewed from the outer side in a radial direction. Referring to FIGS. 2 and 3, the second annular portion 42 is tubular, and is centered on the central axis J. The second annular portion 42 is located inside of the first annular portion 41. The second annular portion 42 is arranged to have an axial dimension greater than the plate thickness of the first annular portion 41. The second annular portion 42 is arranged to project to both the first axial side and the second axial side relative to the first annular portion 41. In the present example embodiment, the second annular portion 42 is arranged to have a circular internal shape. A portion of the second annular portion 42 which lies on the first axial side of an axial middle portion of the second annular portion 42 is arranged to have a regular hexagonal external shape. Meanwhile, a portion of the second annular portion 42 which lies on the second axial side of the axial middle portion of the second annular portion 42 is arranged to have a circular external shape.

Referring to FIG. 2, each of the three first joining portions 43 is arranged to extend perpendicularly to the central axis J. Each of the three first joining portions 43 is connected to two different portions of the first annular portion 41 at longitudinal end portions thereof without crossing any other first joining portion 43. In addition, each of the three first joining portions 43 is connected to the second annular portion 42 at a longitudinal middle portion thereof. Principal surfaces of each of the three first joining portions 43 are arranged to extend perpendicularly to the central axis J. Each first joining portion 43 is arranged to have a plate thickness greater than the plate thickness of the first annular portion 41. The plate thickness of the first joining portion 43 is smaller than the plate thickness of the second annular portion 42.

Each of the three second joining portions 44 is arranged to extend perpendicularly to the central axis J. Each of the three second joining portions 44 is connected to two different portions of the first annular portion 41 at longitudinal end portions thereof without crossing any other second joining portion 44. In addition, each of the three second joining portions 44 is connected to the second annular portion 42 at a longitudinal middle portion thereof. Each second joining portion 44 is arranged to cross two of the three first joining portions 43. Principal surfaces of each of the three second joining portions 44 are arranged to extend perpendicularly to the central axis J. Each second joining portion 44 is arranged to have a plate thickness greater than the plate thickness of each first joining portion 43.

Figure 4:
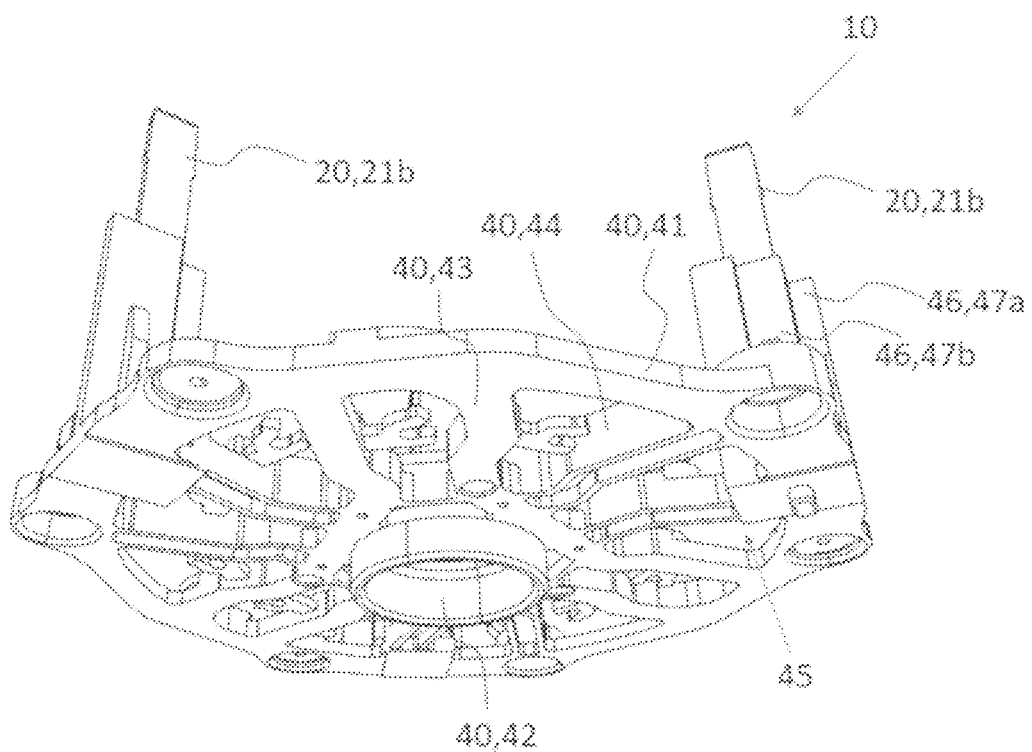
FIG. 4 is a perspective view of the busbar apparatus according to an example embodiment of the present disclosure as viewed from a second axial side.

FIG. 4 is a perspective view of the busbar apparatus according to the present example embodiment as viewed from the second axial side. Referring to FIGS. 2 and 4, the principal surface of each of the three first joining portions 43 and the three second joining portions 44 on the second axial side is arranged at the same axial position as that of the principal surface of the first annular portion 41 on the second axial side. In other words, the principal surface of each of the three first joining portions 43 and the three second joining portions 44 on the side closer to the stator 3 and the principal surface of the first annular portion 41 on the side closer to the stator 3 are arranged at the same axial position. Accordingly, the principal surface of each of the three first joining portions 43 on the first axial side projects to the first axial side relative to the principal surface of the first annular portion 41 on the first axial side. In other words, the principal surface of each of the three first joining portions 43 on the side opposite to the stator projects to the first axial side relative to the principal surface of the first annular portion 41 on the side opposite to the stator 3. In addition, the principal surface of each of the three second joining portions 44 on the first axial side projects to the first axial side relative to the principal surface of each first joining portion 43 on the first axial side.

As a result of crossing of the three first joining portions 43 and the three second joining portions 44, the holder 40 includes twelve through holes 45 each of which is arranged to pass therethrough in the axial direction between the first annular portion 41 and the second annular portion 42. The twelve through holes 45 are arranged in the circumferential direction.

Referring to FIG. 2, the first annular portion 41 has three pairs of opposed portions 46 arranged to project from the principal surface thereof on the first axial side, which corresponds to the flat portion. Each pair of opposed portions 46 is made up of a pair of support portions 47a and 47b arranged opposite to each other in the circumferential direction about the central axis J. Here, the support portion on the first circumferential side is defined as a first support portion 47a, while the support portion on the second circumferential side is defined as a second support portion 47b. The first support portion 47a is displaced radially outward relative to the second support portion 47b. The holder 40 includes the three pairs of opposed portions 46. The three pairs of opposed portions 46 are arranged at equal angular intervals in the circumferential direction about the central axis J. To be more precise, the three first support portions 47a are arranged at equal angular intervals in the circumferential direction about the central axis J. The three second support portions 47b are arranged at equal angular intervals in the circumferential direction about the central axis J.

Surfaces of the first support portion 47a and the second support portion 47b which are opposed to each other are rectangular principal surfaces arranged to extend along the axial direction. The principal surfaces of the first support portion 47a and the second support portion 47b are arranged to be parallel to each other.

Referring to FIG. 2, the electrically conductive members 30 include three first electrically conductive members 31 and three second electrically conductive members 32. Each of the first electrically conductive members 31 and the second electrically conductive members 32 corresponds to an intermediate electrically conductive member.

Each of the three first electrically conductive members 31 is a plate member arranged to have a plate width and a plate thickness smaller than those of the first joining portion 43. Each of the three first electrically conductive members 31 is arranged to extend along the corresponding first joining portion 43, and is insert-molded in the corresponding first joining portion 43. Each of the three first electrically conductive members 31 includes a first joint end portion 31a and first and second coil joint end portions 31b and 31c.

The first joint end portion 31a is defined at one longitudinal end portion of the first electrically conductive member 31. The first joint end portion 31a is in the shape of a disk, and is arranged to have a diameter greater than a plate width of a remaining portion of the first electrically conductive member 31. The first joint end portion 31a is exposed outside of an end portion of the corresponding first joining portion 43. A surface of the first joint end portion 31a on the first axial side is arranged to be smoothly continuous with the surface of the first annular portion 41 on the first axial side.

The first coil joint end portion 31b is defined at a longitudinal end portion of the first electrically conductive member 31 on the side opposite to the first joint end portion 31a. A distal end portion of the first coil joint end portion 31b is arranged to divide into two parts spaced from each other in a radial direction. The first coil joint end portion 31b is arranged to project to the first circumferential side from the corresponding first joining portion 43. That is, the first coil joint end portion 31b is arranged to project to one of the through holes 45.

The second coil joint end portion 31c is a portion arranged to project to the first circumferential side from a longitudinal middle portion of the first electrically conductive member 31, i.e., from a position between the first joint end portion 31a and the first coil joint end portion 31b. A distal end portion of the second coil joint end portion 31c is arranged to divide into two parts spaced from each other in a radial direction. The second coil joint end portion 31c is arranged to project to the first circumferential side from the corresponding first joining portion 43. That is, the second coil joint end portion 31c is arranged to project to one of the through holes 45 different from the through hole 45 to which the first coil joint end portion 31b projects.

Each of the three second electrically conductive members 32 is a plate member arranged to have a plate width and a plate thickness equivalent to those of the first electrically conductive member 31. Accordingly, the plate width and the plate thickness of each of the three second electrically conductive members 32 are smaller than those of the second joining portion 44. Each of the three second electrically conductive members 32 is arranged to extend along the corresponding second joining portion 44, and is insert-molded in the corresponding second joining portion 44. Each second electrically conductive member 32 is located more on the first axial side in the axial direction than each first electrically conductive member 31 by a distance equal to the plate thickness of the first electrically conductive member 31. Each of the three second electrically conductive members 32 includes a second joint end portion 32a and first and second coil joint end portions 32b and 32c.

The second joint end portion 32a is defined at one longitudinal end portion of the second electrically conductive member 32. The second joint end portion 32a is in the shape of a disk, and is arranged to have a diameter greater than a plate width of a remaining portion of the second electrically conductive member 32. The second joint end portion 32a is exposed outside of an end portion of the corresponding second joining portion 44. A surface of the second joint end portion 32a on the first axial side is arranged to be smoothly continuous with the surface of the first annular portion 41 on the first axial side.

The first coil joint end portion 32b is defined at a longitudinal end portion of the second electrically conductive member 32 on the side opposite to the second joint end portion 32a. A distal end portion of the first coil joint end portion 32b is arranged to divide into two parts spaced from each other in a radial direction. The first coil joint end portion 32b is arranged to project to the first circumferential side from the corresponding second joining portion 44. That is, the first coil joint end portion 32b is arranged to project to one of the through holes 45.

The second coil joint end portion 32c is a portion arranged to project to the first circumferential side from a longitudinal middle portion of the second electrically conductive member 32, i.e., from a position between the second joint end portion 32a and the first coil joint end portion 32b. A distal end portion of the second coil joint end portion 32c is arranged to divide into two parts spaced from each other in a radial direction. The second coil joint end portion 32c is arranged to project to the first circumferential side from the corresponding second joining portion 44. That is, the second coil joint end portion 32c is arranged to project to one of the through holes 45 different from the through hole 45 to which the first coil joint end portion 32b projects.

The first joint end portions 31a are arranged at equal angular intervals in the circumferential direction about the central axis J, and the second joint end portions 32a are arranged at equal angular intervals in the circumferential direction about the central axis J. The first joint end portion 31a and the second joint end portion 32a which make a pair have the opposed portions 46 therebetween in the circumferential direction. In more detail, the first joint end portion 31a and the second joint end portion 32a which make a pair are arranged along a tangent to a circle centered on the central axis J at the corresponding opposed portions 46. A distance between the first support portion 47a and the first joint end portion 31a is equal to a distance between the second support portion 47b and the second joint end portion 32a.

The distance from the central axis J to each of the coil joint end portions 31b, 31c, 32b and 32c is equal. In addition, the coil joint end portions 31b, 31c, 32b, and 32c are arranged at equal angular intervals in the circumferential direction about the central axis J. Referring to FIG. 1, each of the coil joint end portions 31b, 31c, 32b, and 32c is joined to one of end portions of coils 6 drawn out from the stator 3.

Next, the busbars 20 will now be described below.

Referring to FIG. 2, the busbar apparatus 10 includes three of the busbars 20. While the three busbars 20 are arranged at equal angular intervals in the circumferential direction about the central axis J, each busbar 20 has the same structure, and therefore, the busbars 20 will be described without being differentiated from each other.

Figure 5:
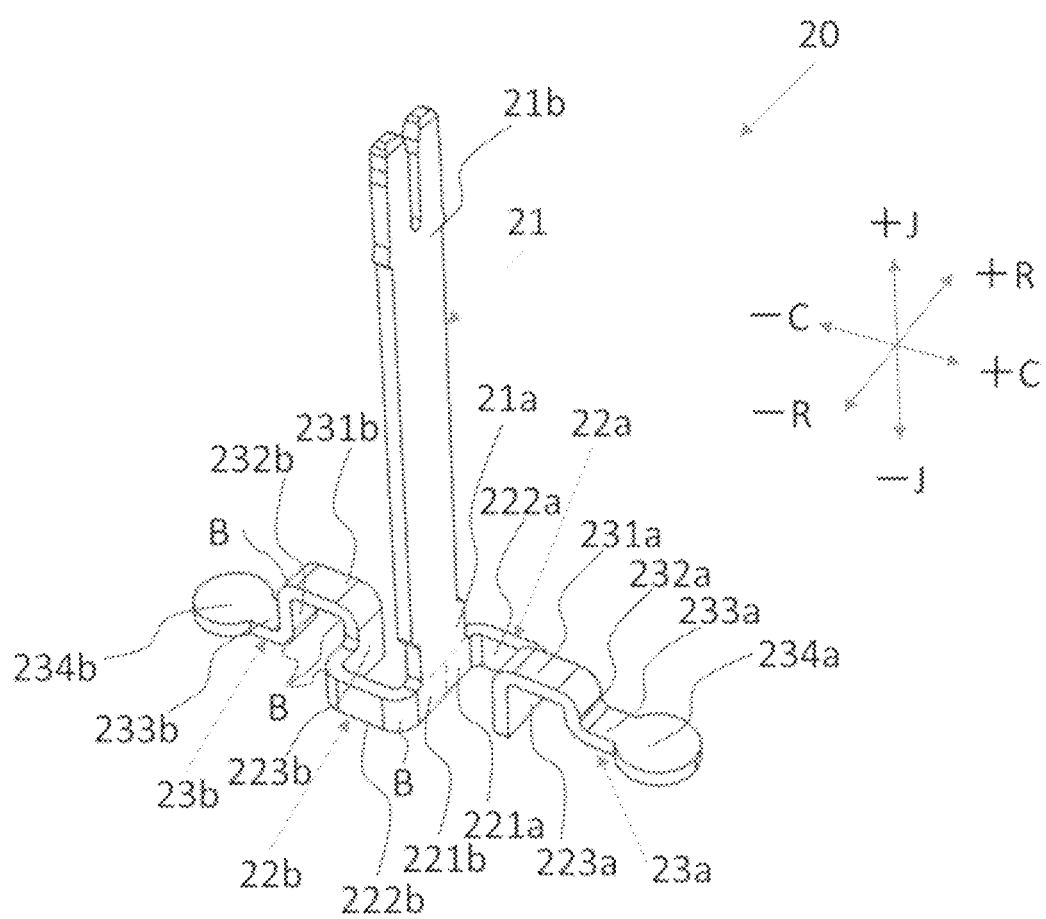
FIG. 5 is a perspective view of a busbar according to an example embodiment of the present disclosure.

FIG. 5 is a perspective view of the busbar according to the present example embodiment. Referring to FIG. 5, the busbar 20 includes a terminal portion 21, a pair of intermediate portions 22a and 22b, and a pair of connection portions 23a and 23b.

Referring to FIGS. 2 and 5, each of which illustrates the busbar(s) 20 as viewed from the first axial side, the intermediate portion 22a includes a plate-shaped first intermediate portion 221a arranged to extend radially inward from a center of the corresponding opposed portions 46, a plate-shaped second intermediate portion 222a arranged to extend to the first circumferential side from a radially inner, distal end portion of the first intermediate portion 221a, and a plate-shaped third intermediate portion 223a arranged to extend radially outward from a distal end portion of the second intermediate portion 222a on the first circumferential side. The intermediate portion 22b includes a plate-shaped first intermediate portion 221b arranged to extend radially outward from the center of the corresponding opposed portions 46, a plate-shaped second intermediate portion 222b arranged to extend to the second circumferential side from a radially outer, distal end portion of the first intermediate portion 221b, and a plate-shaped third intermediate portion 223b arranged to extend radially inward from a distal end portion of the second intermediate portion 222b on the second circumferential side. Principal surfaces of the first intermediate portion 221a of the intermediate portion 22a are arranged to be smoothly continuous with principal surfaces of the first intermediate portion 221b of the intermediate portion 22b. The intermediate portion 22a and the intermediate portion 22b are arranged at the same axial position.

The first intermediate portions 221a and 221b are arranged between the corresponding opposed portions 46, i.e., the corresponding first support portion 47a and the corresponding second support portion 47b. The first intermediate portion 221a and the corresponding first support portion 47a are arranged circumferentially opposite to each other. The first intermediate portion 221b and the corresponding second support portion 47b are arranged circumferentially opposite to each other. The radially inner, distal end portion of the first intermediate portion 221a is located radially inward of a radially inner edge portion of the corresponding first support portion 47a. The radially outer, distal end portion of the first intermediate portion 221b is located radially outward of a radially outer edge portion of the corresponding first support portion 47a. Each of the principal surfaces of the first intermediate portions 221a and 221b is arranged to be perpendicular to the circumferential direction. An edge portion of each of the first intermediate portions 221a and 221b on the second axial side is arranged to be in contact with the holder 40. To be more precise, the edge portion of each of the first intermediate portions 221a and 221b on the second axial side is arranged to be in contact with the surface of the first annular portion 41 on the first axial side.

The second intermediate portion 222a is located radially inside of the corresponding first support portion 47a. The second intermediate portion 222b is located radially outside of the corresponding second support portion 47b. The second intermediate portions 222a and 222b are arranged to have the corresponding opposed portions 46 therebetween in a radial direction. Each of principal surfaces of the second intermediate portions 222a and 222b is arranged to be perpendicular to the radial direction.

The third intermediate portion 223a is located on the first circumferential side of the corresponding first support portion 47a. The third intermediate portion 223b is located on the second circumferential side of the corresponding second support portion 47b. The third intermediate portions 223a and 223b are arranged to have the corresponding opposed portions 46 therebetween in the circumferential direction. In addition, the first intermediate portion 221a and the third intermediate portion 223a are arranged to have the corresponding first support portion 47a therebetween in the circumferential direction. Further, the first intermediate portion 221b and the third intermediate portion 223b are arranged to have the corresponding second support portion 47b therebetween in the circumferential direction. Each of principal surfaces of the third intermediate portions 223a and 223b is arranged to be perpendicular to the circumferential direction. Each of the principal surfaces of the third intermediate portions 223a and 223b is arranged to be parallel to each of the principal surfaces of the first intermediate portions 221a and 221b. The pair of intermediate portions 22a and 22b as a whole forms the shape of the letter "S" when viewed along the axial direction. The pair of intermediate portions 22a and 22b is arranged to have a constant plate width, i.e., a constant axial dimension. The pair of intermediate portions 22a and 22b is arranged to have point symmetry with respect to the terminal portion 21. An edge portion of each of the intermediate portions 22a and 22b on the second axial side is arranged to be in contact with the principal surface of the first annular portion 41 on the first axial side. That is, the intermediate portions 22a and 22b are arranged along the principal surface, which corresponds to the flat portion, of the first annular portion 41 on the first axial side. Here, an edge portion of the intermediate portions 22a and 22b on the first axial side is defined as an edge portion 25. The edge portion 25 extends over all of the first intermediate portions 221a and 221b, the second intermediate portions 222a and 222b, and the third intermediate portions 223a and 223b. That is, the edge portion 25 refers to surfaces of the intermediate portions 22a and 22b which extend perpendicularly to the axial direction. The edge portion 25 is a junction between the terminal portion 21, which will be described in detail below, and each of the connection portions 23a and 23b.

The terminal portion 21 is a plate-shaped portion arranged to extend to the first axial side from edge portions of the first intermediate portions 221a and 221b on the first axial side, i.e., from a portion of the edge portion 25. The terminal portion 21 includes a first terminal portion 21a arranged to extend from the edge portion 25 to the first axial side, and a second terminal portion 21b arranged to extend to the first axial side from a distal end portion of the first terminal portion 21a. The terminal portion 21 is arranged between the corresponding opposed portions 46. Each of principal surfaces of the first terminal portion 21a and the second terminal portion 21b is arranged to be perpendicular to the circumferential direction. A thickness direction of the terminal portion 21 is the circumferential direction. The principal surfaces of the first terminal portion 21a and the second terminal portion 21b are arranged to be smoothly continuous with the principal surfaces of the first intermediate portions 221a and 221b.

The second terminal portion 21b is displaced radially outward relative to the first terminal portion 21a. The extent of the radial displacement between the first terminal portion 21a and the second terminal portion 21b is equal to a plate thickness of each of the intermediate portions 22a and 22b. As a result, the second terminal portion 21b and the second intermediate portion 222b overlap with each other when viewed in the axial direction. The radially outward displacement of the second terminal portion 21b correspondingly increases a spare space around the central axis J. A distal end portion of the second terminal portion 21b is connected to an external device (not shown). The external device is, for example, a control circuit board of the electric power steering apparatus. The external device may alternatively be a control circuit board having a power supply circuit or a power conversion device. That is, the terminal portion 21 is connected to a control circuit board. Power is supplied from the external device to drive the motor 1.

The plate width, i.e., the radial dimension, of the terminal portion 21 is preferably equal to or greater than twice the plate width of each of the intermediate portions 22a and 22b. The terminal portion 21 is arranged to project to the first axial side relative to an end portion of each of the corresponding opposed portions 46 on the first axial side.

The connection portion 23a includes a first connection portion 231a arranged to extend to the first circumferential side from an edge portion of the third intermediate portion 223a on the first axial side, i.e., from a portion of the edge portion 25, a second connection portion 232a arranged to extend to the second axial side from a distal end portion of the first connection portion 231a, and a third connection portion 233a arranged to extend to the first circumferential side from a distal end portion of the second connection portion 232a. The connection portion 23b includes a first connection portion 231b arranged to extend to the second circumferential side from an edge portion of the third intermediate portion 223b on the first axial side, i.e., from a portion of the edge portion 25, a second connection portion 232b arranged to extend to the second axial side from a distal end portion of the first connection portion 231b, and a third connection portion 233b arranged to extend to the second circumferential side from a distal end portion of the second connection portion 232b.

Each of principal surfaces of the first connection portions 231a and 231b and principal surfaces of the third connection portions 233a and 233b is arranged to be perpendicular to the axial direction. A thickness direction of each of the first connection portions 231a and 231b and the third connection portions 233a and 233b is the axial direction. Each of principal surfaces of the second connection portions 232a and 232b is arranged to be perpendicular to the circumferential direction. Each of the principal surfaces of the second connection portions 232a and 232b is arranged to be parallel to each of the principal surfaces of the terminal portion 21, the first intermediate portions 221a and 221b, and the third intermediate portions 223a and 223b. A thickness direction of each of the second connection portions 232a and 232b is the circumferential direction.

Distal end portions of the third connection portions 233a and 233b are disk-shaped busbar joint end portions 234a and 234b, respectively, each of which is arranged to have a diameter greater than a plate width of a remaining portion of each of the connection portions 23a and 23b. The diameter of each of the busbar joint end portions 234a and 234b is arranged to be smaller than the diameter of each of the first and second joint end portions 31a and 32a.

The second connection portion 232b is arranged to have an axial dimension greater than an axial dimension of the second connection portion 232a by the plate thickness of each second electrically conductive member 32. A surface of the busbar joint end portion 234a on the second axial side is arranged to overlap with the surface of the corresponding first joint end portion 31a on the first axial side. A surface of the busbar joint end portion 234b on the second axial side is arranged to overlap with the surface of the corresponding second joint end portion 32a on the first axial side. The busbar joint end portion 234a and the corresponding first joint end portion 31a are joined to each other through, for example, projection welding. The busbar joint end portion 234b and the corresponding second joint end portion 32a are joined to each other through, for example, projection welding. Each of the connection portions 23a and 23b is arranged to have a plate width equal to the plate width of each of the intermediate portions 22a and 22b.

If a portion of the busbar 20 is described as being arranged in a vertical orientation, it means that this portion is arranged to have principal surfaces thereof parallel to the axial direction. If a portion of the busbar 20 is described as being arranged in a horizontal orientation, it means that this portion is arranged to have principal surfaces thereof not parallel to the axial direction, particularly, perpendicular to the axial direction. In the present example embodiment, the busbar 20 is arranged such that each of the terminal portion 21 and the intermediate portions 22a and 22b is in the vertical orientation while each of the connection portions 23a and 23b is in the horizontal orientation.

Thus, in the busbar 20, each of a boundary between the intermediate portion 22a and the connection portion 23a and a boundary between the intermediate portion 22b and the connection portion 23b is bent. To be more precise, each of a boundary portion B between the third intermediate portion 223a and the first connection portion 231a and a boundary portion B between the third intermediate portion 223b and the first connection portion 231b is bent. Further, each of a boundary portion B between the first connection portion 231a and the second connection portion 232a, a boundary portion B between the first connection portion 231b and the second connection portion 232b, a boundary portion B between the second connection portion 232a and the third connection portion 233a, and a boundary portion B between the second connection portion 232b and the third connection portion 233b is bent. In other words, each intermediate portion includes a first intermediate portion continuous with the terminal portion, and a second intermediate portion continuous with the connection portion, and further includes at least one bent boundary portion between the first intermediate portion and the second intermediate portion. A stress would be reduced at each boundary portion B through a deformation at the boundary portion B. Accordingly, even if an axial stress is applied to the busbar 20, for example, when connection between the external device (not shown) and the terminal portion 21 is broken, a force exerted on each of the connection portions 23a and 23b is reduced. Therefore, a break in connection between the connection portions 23a and 23b and the corresponding first electrically conductive member 31 and the corresponding second electrically conductive member 32, respectively, does not easily occur.

In addition, each of a boundary portion B between the first intermediate portion 221a and the second intermediate portion 222a, a boundary portion B between the first intermediate portion 221b and the second intermediate portion 222b, a boundary portion B between the second intermediate portion 222a and the third intermediate portion 223a, and a boundary portion B between the second intermediate portion 222b and the third intermediate portion 223b is bent. Accordingly, even if a radial stress is applied to the busbar 20, a force exerted on each of the connection portions 23a and 23b is reduced. Therefore, a break in the connection between the connection portions 23a and 23b and the corresponding first electrically conductive member 31 and the corresponding second electrically conductive member 32, respectively, does not easily occur. In other words, each of the intermediate portions 22a and 22b includes the first intermediate portion 221a or 221b, which is continuous with the terminal portion 21, and the third intermediate portion 223a or 223b, which is continuous with the connection portion 23a or 23b, and further includes the boundary portions B between the first intermediate portion 221a or 221b and the third intermediate portion 223a or 223b.

The busbar apparatus 10, which includes the busbars 20, is attached to the motor 1 used in the electric power steering apparatus. Heat is inputted to and released from components of the electric power steering apparatus, such as, for example, the control circuit board and the motor 1, through supply of electric current or an operation of the motor 1 or due to an external environment. That is, the components of the electric power steering apparatus may experience thermal expansion and thermal contraction due to the input and release of heat. However, different metal materials are used to make the components of the electric power steering apparatus. In other words, components of the electric power steering apparatus have different coefficients of linear expansion, and are therefore different in extent of deformation and displacement. Accordingly, a deformation and a displacement of each component of the electric power steering apparatus may be inputted also to the busbars 20, which connect the control circuit board and the motor 1 to each other. That is, the busbars 20 may receive an external force. However, each busbar 20 includes the bent boundary portions B as described above, and therefore, a distal end portion of the terminal portion 21 thereof is capable of moving relative to each of the busbar joint end portions 234a and 234b in the axial, radial, and circumferential directions. Thus, the busbar 20 has a flexible structure, including the bent boundary portions B, and this contributes to reducing a stress applied to the control circuit board, to which the busbar 20 is connected.

The plate width of the terminal portion 21 is preferably equal to or greater than twice the plate width of each of the intermediate portions 22a and 22b. This contributes to reducing losses of electric current in the busbars 20, the busbar apparatus 10, and the motor 1, and thus to reducing generation of heat.

Further, since each busbar 20 is arranged to extend in the circumferential direction, a relatively large space in which the electrically conductive members are arranged can be secured radially inside of the busbars 20. In particular, since the direction in which each of the principal surfaces of the terminal portion 21 faces and the direction in which each of the connection portions 23a and 23b extends are the same, a reduction in the size of the busbar 20 as a whole can be achieved. In other words, each of the principal surfaces of the terminal portion 21 and each of the principal surfaces of the connection portions 23a and 23b are skew to each other, i.e., neither intersect each other nor are parallel to each other.

Next, a method of manufacturing the busbars 20 will now be described below.

Figure 6:
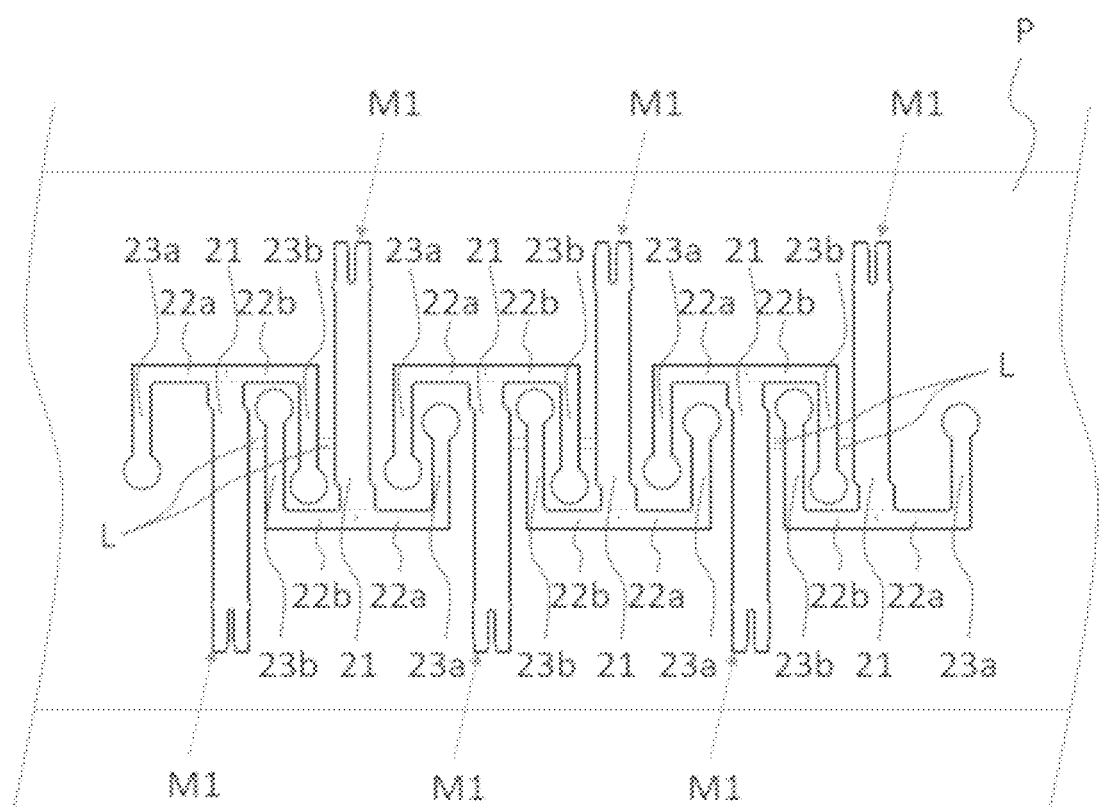
FIG. 6 is a plan view illustrating an arrangement of materials which are stamped out of an electrically conductive plate material to define busbars according to an example embodiment of the present disclosure.

FIG. 6 is a plan view illustrating an arrangement of materials which are stamped out of an electrically conductive plate material to define busbars according to the present example embodiment, that is, an arrangement of materials from each of which the terminal portion, the intermediate portions, and the connection portions are to be made. Referring to FIG. 6, a step of stamping materials M1 of the busbars 20 out of an electrically conductive, metal plate material P is first performed. In this stamping step, a plurality of materials M1 are stamped out at a time. Notice that each terminal portion 21 extends in a vertical direction in FIG. 6. A plate width direction of the terminal portion 21 is a left-right direction in FIG. 6. Each of the intermediate portions 22a and 22b extends in the left-right direction in FIG. 6. A plate width direction of each of the intermediate portions 22a and 22b is the vertical direction in FIG. 6. Each of the connection portions 23a and 23b extends in the vertical direction in FIG. 6. A plate width direction of each of the connection portions 23a and 23b is the left-right direction in FIG. 6.

In more detail, the materials M1 are stamped out with connecting portions L connecting the materials M1. That is, the plurality of busbars 20 are stamped out of the same plate material P. When the plurality of materials M1 are stamped out, one of the materials M1 has, between the terminal portion 21 and each of the connection portions 23a and 23b thereof, the connection portions 23a and 23b of other of the materials M1. In addition, the plurality of materials M1 are stamped out of the metal plate material with the terminal portion 21 of one of the materials M1 arranged between the connection portion 23a of another one of the materials M1 and the connection portion 23b of yet another one of the materials M1. This is due to the U-shaped arrangement of the terminal portion 21, the intermediate portion 22a, and the connection portion 23a of each of the materials M1 stamped out of the plate material P as illustrated in FIG. 6. This is also due to the U-shaped arrangement of the terminal portion 21, the intermediate portion 22b, and the connection portion 23b of the material M1. Further, this is also because the following dimensional relationships are satisfied. That is, in each material M1, a sum of a dimension of the terminal portion 21 measured in a longitudinal direction thereof (i.e., the vertical direction in FIG. 6) and a dimension of each of the intermediate portions 22a and 22b measured in the plate width direction thereof (i.e., the vertical direction in FIG. 6) is greater than a sum of a dimension of each of the connection portions 23a and 23b measured in a longitudinal direction thereof (i.e., the vertical direction in FIG. 6) and a dimension of each of the intermediate portions 22a and 22b measured in the plate width direction thereof (i.e., the vertical direction in FIG. 6). In addition, in each material M1, a dimension of an interspace between the terminal portion 21 and each of the connection portions 23a and 23b (measured in the left-right direction in FIG. 6) is greater than the diameter of each of the busbar joint end portions 234a and 234b at the distal ends of the connection portions 23a and 23b, respectively.

Thus, in the material M1, the terminal portion 21 and the connection portions 23a and 23b are arranged in a radial direction, which is a direction in which each of the intermediate portions 22a and 22b extends. That is, the material M1 is stamped out with at least the shape of the letter "U" formed by portions thereof. An intervening portion between the terminal portion 21 and each of the connection portions 23a and 23b of one of the materials M1 may be a waste for the one material M1, but a portion of another one of the materials M1 is made from the intervening portion, and therefore, the busbar apparatus 10, a method of manufacturing which includes the above stamping step, and hence the motor 1 are able to achieve an improved material yield in manufacturing.

Next, a removing step of removing the connecting portions L from the plurality of materials M1 stamped out of the metal plate material is performed. In this removing step, the connecting portions L are removed from the materials M1 by stamping out the connecting portions L out of the materials M1 or cutting off the connecting portions L, so that the materials M1 are disconnected from one another. The terminal portion 21 is defined as a result of the removing step.

Since the plurality of materials M1 are stamped out at a time as described above, the busbar apparatus 10, the method of manufacturing which includes the above-described stamping step, and hence the motor 1 are able to achieve a reduction in the number of steps for manufacture thereof when compared to the case where the materials M1 are stamped out one by one.

In addition, since the plurality of materials M1 are stamped out with the connecting portions L connecting the materials M1, dimensional accuracy of the materials M1 is high.

Figure 7:
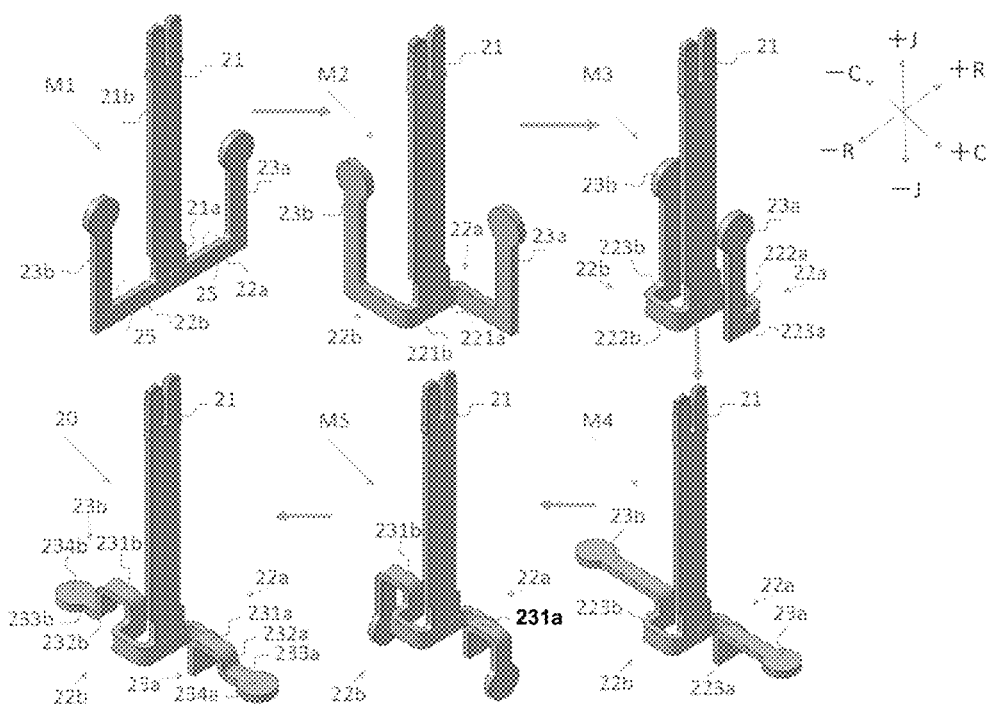
FIG. 7 is a perspective view illustrating a process by which a material from which the busbar is to be made is formed into the busbar according to an example embodiment of the present disclosure.

Next, a bending step of appropriately bending the material M1 is performed as illustrated in FIG. 7. FIG. 7 is a perspective view illustrating a process by which the material M1, from which the busbar is to be made, is formed into the busbar according to the present example embodiment.

To describe in detail, as illustrated in FIG. 7, the intermediate portions 22a and 22b of the material M1, each of which extends in a radial direction, are first bent at positions that have the terminal portion 21 therebetween. More specifically, the intermediate portion 22a is bent toward the first circumferential side. In addition, the intermediate portion 22b, which extends along the radial direction, is bent toward the second circumferential side. The first intermediate portions 221a and 221b are defined as a result of this bending step. In other words, a material M2 is defined.

Next, in the material M2, the intermediate portion 22a is bent radially outward, and the intermediate portion 22b is bent radially inward. The second intermediate portions 222a and 222b and the third intermediate portions 223a and 223b are defined as a result of this bending step. In other words, a material M3 is defined.

Next, in the material M3, the connection portion 23a, which is continuous with the edge portion of the third intermediate portion 223a on the first axial side, i.e., a portion of the edge portion 25, is bent toward the first circumferential side, and the connection portion 23b, which is continuous with the edge portion of the third intermediate portion 223b on the first axial side, i.e., a portion of the edge portion 25, is bent toward the second circumferential side. In other words, a material M4 is defined.

Next, in the material M4, each of the connection portions 23a and 23b is bent toward the second axial side. The first connection portions 231a and 231b are defined as a result of this bending step. In other words, a material M5 is defined.

Next, in the material M5, the connection portion 23a is bent toward the first circumferential side, and the connection portion 23b is bent toward the second circumferential side. The second connection portions 232a and 232b and the third connection portions 233a and 233b are defined as a result of this bending step. In other words, the busbar 20 is defined.

As described above, the busbars 20 are manufactured through a combination of the step of stamping out of the electrically conductive, metal plate material and the bending step. Thus, a process of manufacturing the busbars 20 is simplified.

Next, the method of manufacturing the busbar apparatus will now be described below. The electrically conductive members 30 are separately stamped out of an electrically conductive, metal plate material, and are thereafter unified with the holder 40 beforehand through an insert molding process.

Referring to FIG. 2, each busbar 20 is fitted to the holder 40 with the first intermediate portions 221a and 221b and the terminal portion 21 thereof entering into a space between the corresponding opposed portions 46. In this fitting step, the busbar joint end portion 234a of the busbar 20 is arranged to overlap with the first joint end portion 31a of the corresponding first electrically conductive member 31 when viewed in the axial direction, and the busbar joint end portion 234b of the busbar 20 is arranged to overlap with the second joint end portion 32a of the corresponding second electrically conductive member 32 when viewed in the axial direction.

Next, the busbar joint end portion 234a and the first joint end portion 31a are joined together through projection welding. Similarly, the busbar joint end portion 234b and the second joint end portion 32a are joined together through projection welding.

As described above, the busbar apparatus 10 is manufactured through a combination of the fitting step of fitting the busbars 20 to the holder 40, which is unified with the electrically conductive members 30 beforehand through the insert molding process, and a welding step of welding the overlapping metal portions together. Thus, a process of manufacturing the busbar apparatus 10, and hence a process of manufacturing the motor 1, are simplified. This leads to a reduced manufacturing load of the busbar apparatus 10 and hence a reduced manufacturing load of the motor 1.

In addition, the overlapping of the busbar joint end portion 234a and the first joint end portion 31a facilitates the welding operation therefor. Similarly, the overlapping of the busbar joint end portion 234b and the second joint end portion 32a facilitates the welding operation therefor.

Next, a method of manufacturing the motor 1 will now be described below. Referring to FIG. 1, the stator 3 and the rotor 4 are fitted to the housing 2 beforehand through a known process. Lead wires 7 drawn out from the coils 6 of the stator 3 are drawn out to the first axial side of the stator 3. Each of the coils 6 is a power supply target to which power is supplied from the external device. The term "power supply target" refers to an end target to which power is to be supplied from the external device. The electrically conductive members 30, i.e., the first electrically conductive members 31 and the second electrically conductive members 32, are intermediate electrically conductive members connected to the power supply targets to which the power is supplied from the external device.

Referring to FIG. 1, the busbar apparatus 10 is moved from the first axial side to the second axial side toward the housing 2 with the stator 3 and the rotor 4 fitted therein, so that the busbar apparatus 10 is housed in the housing 2.

Next, each of the coil joint end portions 31*b*, 31*c*, 32*b*, and 32*c* is welded to a corresponding one of the lead wires 7 drawn out from the stator 3 to the first axial side. This welding is achieved, for example, through resistance welding. As a result of this welding, each of the coil joint end portions 31*b*, 31*c*, 32*b*, and 32*c* is unified with the corresponding lead wire 7, so that the busbar apparatus 10 and the housing 2 are unified to manufacture the motor 1.

As described above, the motor 1 is manufactured through a combination of a simple moving step of moving the busbar apparatus 10 in the axial direction toward the housing 2 previously unified with the stator 3 and the rotor 4 and a simple welding step of welding each of the lead wires 7 to a corresponding one of the coil joint end portions 31*b*, 31*c*, 32*b*, and 32*c*. Because the combination is made up of simple steps, a reduced manufacturing load of the motor 1 is achieved.

Next, modifications of the above-described example embodiment will now be described below.

In the above-described example embodiment, each of the intermediate portions may alternatively be a plate extending straight. In this case, the intermediate portion does not include a boundary between plates extending in different directions. Thus, the step of making the material M3 from the material M2, i.e., a bending step, is eliminated from the above-described example embodiment. Accordingly, in the case where each of the intermediate portions of the busbar is a plate extending straight, a reduction in the number of steps for manufacturing the busbar is achieved due to the elimination of the above bending step.

In the above-described example embodiment, each of the connection portions may alternatively be a plate extending straight. In this case, the connection portion does not include a boundary between plates extending in different directions. Thus, the step of making the material M5 from the material M4, i.e., a bending step, and the step of making the busbar 20 from the material M5, i.e., a bending step, are eliminated from the above-described example embodiment. Accordingly, in the case where each of the connection portions of the busbar is a plate extending straight, a reduction in the number of steps for manufacturing the busbar is achieved due to the elimination of the above bending steps.

In the above-described example embodiment, the first electrically conductive members 31 and the second electrically conductive members 32 may be omitted. In this case, the lead wires 7 extending from the coils 6 may be directly connected to the corresponding connection portions 23*a* and 23*b* of the busbars 20. Thus, a reduction in the number of members of the busbar apparatus 10, and hence a reduction in the number of members of the motor 1, are achieved due to the omission of the first electrically conductive members 31 and the second electrically conductive members 32. Accordingly, a reduction in weight of the busbar apparatus 10, and hence a reduction in weight of the motor 1, are achieved.

In the above-described example embodiment, each busbar may include only one intermediate portion and only one connection portion for one terminal portion.

Figure 8:
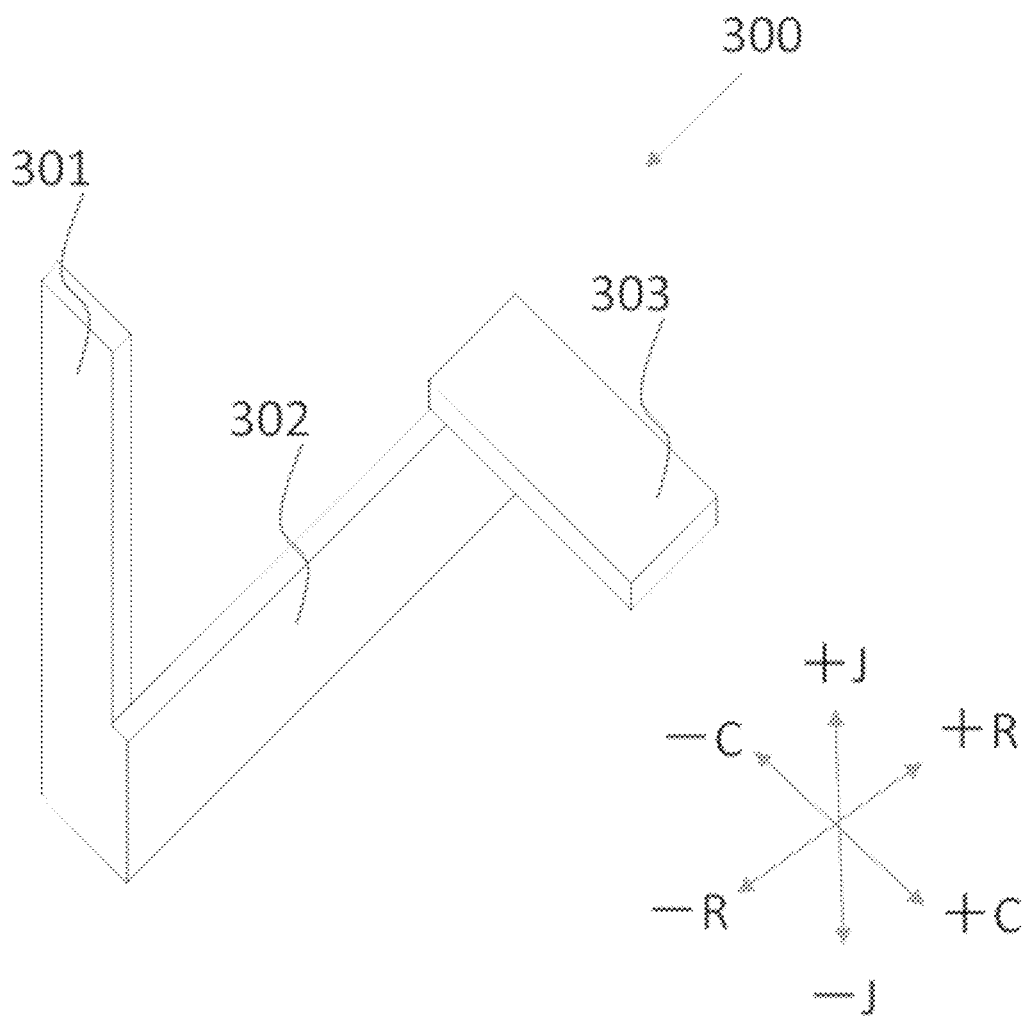
FIG. 8 is a perspective view of a busbar according to a modification of an example embodiment of the present disclosure.

FIG. 8 is a perspective view of a busbar 300 according to a modification of the above-described example embodiment. Referring to FIG. 8, for example, the busbar 300 includes a terminal portion 301 arranged to extend in the axial direction, an intermediate portion 302 arranged to extend in a radial direction, and a connection portion 303 arranged to extend in the circumferential direction. A plate thickness direction of the terminal portion 301 is the radial direction. Each of principal surfaces of the terminal portion 301 is arranged to be perpendicular to the radial direction. A plate thickness direction of the intermediate portion 302 is the circumferential direction. Each of principal surfaces of the intermediate portion 302 is arranged to be perpendicular to the circumferential direction. A plate thickness direction of the connection portion 303 is the axial direction. Each of principal surfaces of the connection portion 303 is arranged to be perpendicular to the axial direction. The above arrangement is able to achieve advantageous effects similar to those of the above-described example embodiment.

Figure 9:
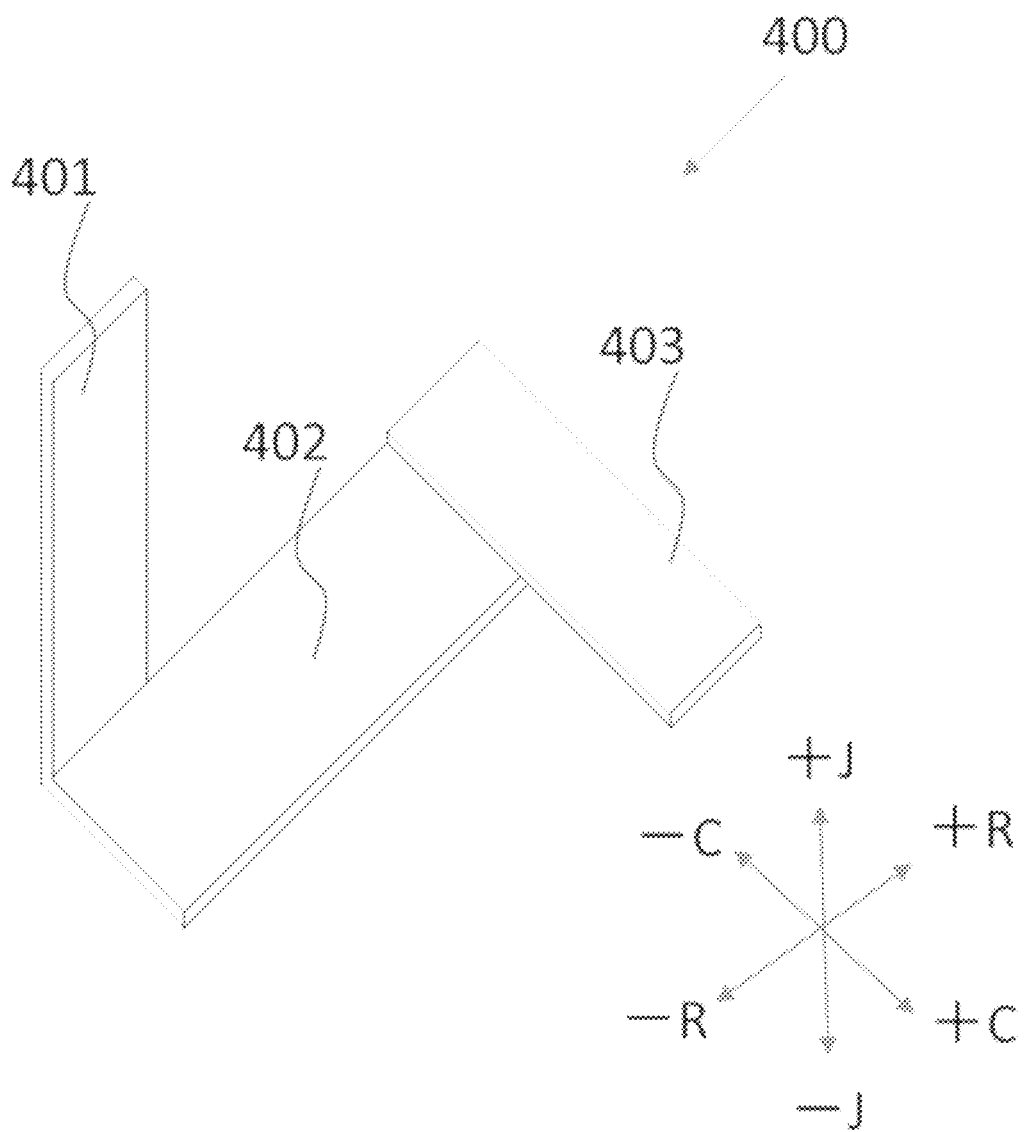
FIG. 9 is a perspective view of a busbar according to a modification of an example embodiment of the present disclosure.

FIG. 9 is a perspective view of a busbar 400 according to a modification of the above-described example embodiment. Referring to FIG. 9, for example, the busbar 400 includes a terminal portion 401 arranged to extend in the axial direction, an intermediate portion 402 arranged to extend in a radial direction, and a connection portion 403 arranged to extend in the circumferential direction. A plate thickness direction of the terminal portion 401 is the circumferential direction. Each of principal surfaces of the terminal portion 401 is arranged to be perpendicular to the circumferential direction. A plate thickness direction of the intermediate portion 402 is the axial direction. Each of principal surfaces of the intermediate portion 402 is arranged to be perpendicular to the axial direction. A plate thickness direction of the connection portion 403 is the axial direction. Each of principal surfaces of the connection portion 403 is arranged to be perpendicular to the axial direction. The above arrangement is also able to achieve advantageous effects similar to those of the above-described example embodiment.

Figure 10:
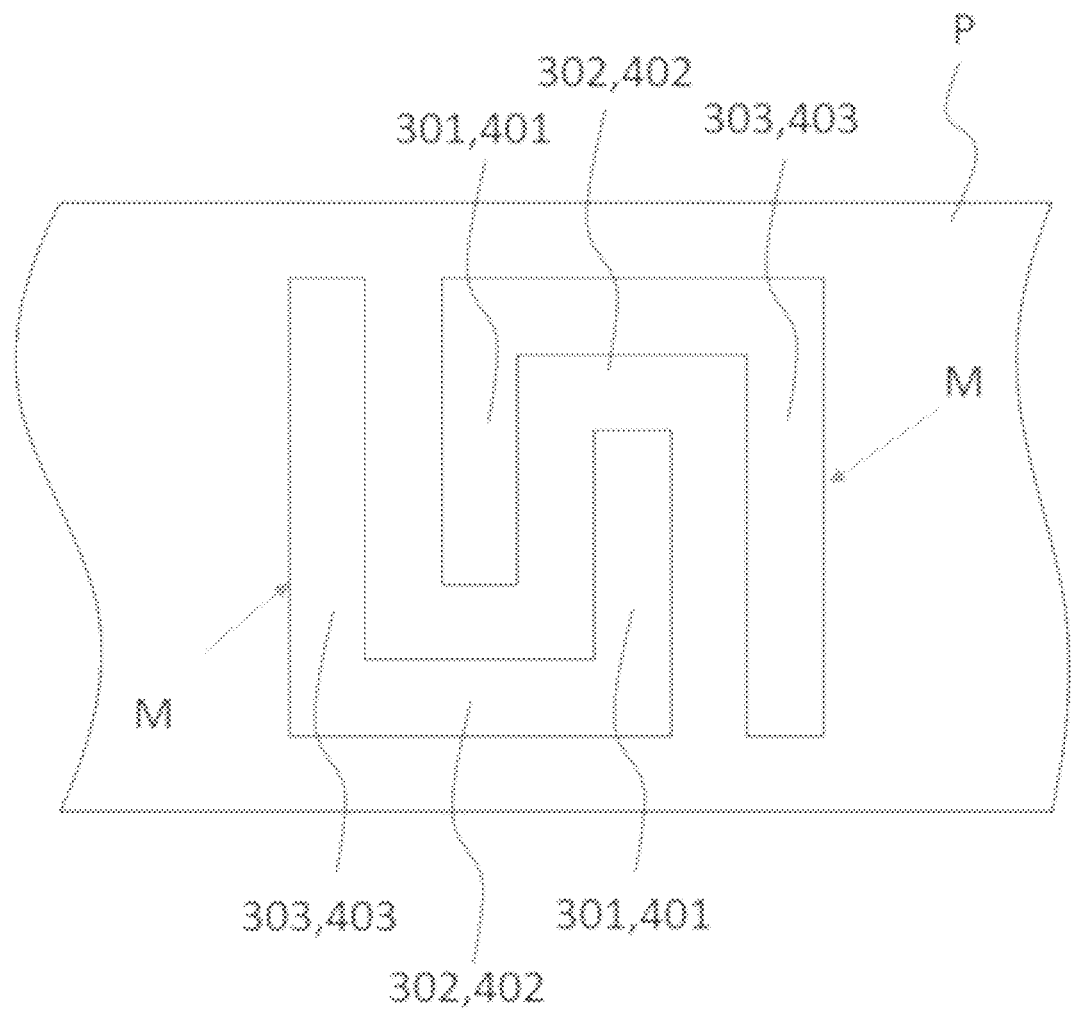
FIG. 10 is a plan view illustrating an arrangement of materials which are stamped out of an electrically conductive plate material to define busbars according to a modification of an example embodiment of the present disclosure.

FIG. 10 is a plan view illustrating an arrangement of materials M which are stamped out of an electrically conductive plate material P to define busbars according to a modification of the above-described example embodiment. In the case where busbars having the shape according to either of the above modifications are adopted, each of materials M from which the busbars are to be made is substantially in the shape of the letter "U" as illustrated in FIG. 10. In this case, the materials M can be stamped out such that a terminal portion and a connection portion of one of the materials M have a connection portion of another one of the materials M therebetween, which leads to an improved yield of the plate material P.

In the above-described example embodiment, the connecting portions L connecting one of the materials M and another one of the materials M may be omitted. In this case, two or more of the materials M may be stamped out of the plate material P at a time, or alternatively, the materials M may be stamped out of the plate material P one by one.

In the above-described example embodiment, positions at which the material M is bent and an order in which the material M is bent at the respective positions in the step of bending the material M to shape the busbar 20 are not limited to the positions and the order described in the above description of the above-described example embodiment. In the case where busbars arranged to have point symmetry with respect to the terminal portion are adopted as in the above-described example embodiment, it is preferable that the material M is bent from a center outward, i.e., from the terminal portion toward the intermediate portion and then from the intermediate portion toward the connection portion. This arrangement reduces the likelihood that a jig or the like which is used for bending will be caught between, for example, the terminal portion and the connection portion, and facilitates the bending step.

In the above-described example embodiment, each of the intermediate portions and the connection portions includes two bent boundary portions, but may alternatively include only one such boundary portion, three or more such boundary portions, or no such boundary portion. Note that the terminal portion may include one or more such boundary portions.

In each of the above-described example embodiment and the above-described modifications thereof, the shape of the distal end portion of each connection portion may be modified appropriately in accordance with the shape of a connection target thereof. In the case where the connection portion is directly connected to one of the lead wires drawn out from the coils, the distal end portion of the connection portion may be arranged to divide into two parts as is the case with each of the first and second coil joint end portions according to the above-described example embodiment.

In each of the above-described example embodiment and the above-described modifications thereof, the shape of the distal end portion of the terminal portion may be modified appropriately in accordance with the external device.

In the above-described example embodiment, the principal surfaces of the first intermediate portion and the principal surfaces of the third intermediate portion may not be parallel to one another.

In the above-described example embodiment, the principal surfaces of the first connection portion and the principal surfaces of the third connection portion may not be parallel to one another.

In the above-described example embodiment, the motor may not necessarily be applied to the electric power steering apparatus. The motor may alternatively be applied to any other desirable device, such as, for example, a motor used as a source of power to drive a vehicle or an oil pump.

In the above-described example embodiment, the busbar apparatus may not necessarily be applied to the motor. The busbar apparatus may alternatively be applied to an electronic control unit, such as, for example, an inverter module.

In each of the above-described example embodiment and the above-described modifications thereof, the direction in which each portion of each busbar extends and the directions in which the principal surfaces of each portion of each busbar extend may be appropriately modified. For example, the direction in which the terminal portion extends may not be parallel to the axial direction of the motor. Also, the thickness directions of the terminal portion, the intermediate portion, and the connection portion are perpendicular to one another in each of the above-described example embodiment and the above-described modifications thereof, but may not necessarily be perpendicular to one another, and may be simply not parallel to one another. It may be sufficient if the thickness direction of the distal end portion of the terminal portion and the thickness direction of the distal end portion of the connection portion are not parallel to each other.

Features of the above-described example embodiment and the above-described modifications thereof may be combined as long as no technical conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A busbar apparatus comprising:
   a busbar to be connected to an external device; and
   a holder to hold the busbar and made of an insulating material; wherein
   the busbar includes a terminal portion to be connected to the external device, an intermediate portion continuous with the terminal portion, and a connection portion continuous with the intermediate portion;
   the intermediate portion includes an edge portion including portions extending along a first axis;
   the terminal portion extends from the edge portion;
   the connection portion extends from the edge portion away from the terminal portion;
   the terminal portion has a thickness direction extending along a second axis not parallel to the first axis; and
   the connection portion has a thickness direction not parallel to the second axis.

2. The busbar apparatus according to claim 1, wherein the intermediate portion includes a first intermediate portion continuous with the terminal portion, and a second intermediate portion continuous with the connection portion, and further includes at least one bent boundary portion between the first intermediate portion and the second intermediate portion.

3. The busbar apparatus according to claim 1, wherein
   the connection portion extending along the second axis, the second axis being perpendicular or substantially perpendicular to the first axis; and
   the terminal portion extending along a third axis parallel to neither the first axis nor the second axis.

4. The busbar apparatus according to claim 3, wherein the terminal portion extending along the third axis, the third axis being perpendicular or substantially perpendicular to both the first axis and the second axis.

5. The busbar apparatus according to claim 1, wherein
   the intermediate portion includes a first intermediate portion continuous with the terminal portion, a second intermediate portion continuous with a distal end portion of the first intermediate portion, and a third intermediate portion continuous with both a distal end portion of the second intermediate portion and the connection portion; and
   the first intermediate portion includes a principal surface, and the third intermediate portion includes a principal surface parallel or substantially parallel to the principal surface of the first intermediate portion.

6. The busbar apparatus according to claim 1, wherein
   the connection portion includes a first connection portion continuous with the intermediate portion, a second connection portion continuous with a distal end portion of the first connection portion, and a third connection portion continuous with a distal end portion of the second connection portion; and
   the first connection portion includes a principal surface, and the third connection portion includes a principal surface parallel or substantially parallel to the principal surface of the first connection portion.

7. The busbar apparatus according to claim 1, wherein
   the busbar includes a pair of the intermediate portions and a pair of the connection portions for the one terminal portion;
   one of the pair of connection portions is continuous with one of the pair of intermediate portions; and
   another one of the pair of connection portions is continuous with another one of the pair of intermediate portions.

8. The busbar apparatus according to claim 7, wherein
   each intermediate portion has a plate width equal to a plate width of each connection portion; and the terminal portion has a plate width equal to or greater than twice the plate width of each of the intermediate portions and the connection portions.

9. The busbar apparatus according to claim 1, wherein
the holder includes a flat portion and a support portion extends from the flat portion;
the terminal portion extends along the support portion; and
at least one of the intermediate portion and the connection portion extends along the flat portion.

10. The busbar apparatus according to claim 9, wherein
the holder includes opposed portions including a pair of the support portions; and
the terminal portion is between the opposed portions.

11. The busbar apparatus according to claim 1, further comprising an intermediate electrical conductor to be connected to a power supply target to which power is to be supplied from the external device; wherein
the intermediate electrical conductor is held by the holder; and
the connection portion is connected to the intermediate electrical conductor.

12. A motor comprising a stator including a coil, a rotor supported to be capable of rotating relative to the stator, and the busbar apparatus of claim 1, wherein the busbar is capable of connecting the external device and a lead wire drawn out from the coil of the stator to each other.

* * * * *